United States Patent
Barsness et al.

(10) Patent No.: US 9,372,780 B2
(45) Date of Patent: *Jun. 21, 2016

(54) BREAKPOINT CONTINUATION FOR STREAM COMPUTING

(71) Applicant: International Business Machines Corporation, Armonk, NY (US)

(72) Inventors: Eric L. Barsness, Pine Island, MN (US); Michael J. Branson, Rochester, MN (US); Bradford L. Cobb, Cedar Park, TX (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 130 days.

This patent is subject to a terminal disclaimer.

(21) Appl. No.: 13/930,936

(22) Filed: Jun. 28, 2013

(65) Prior Publication Data

US 2015/0007143 A1 Jan. 1, 2015

(51) Int. Cl.
*G06F 9/44* (2006.01)
*G06F 11/36* (2006.01)

(52) U.S. Cl.
CPC .................. *G06F 11/3636* (2013.01)

(58) Field of Classification Search
CPC ....................................................... G06F 9/44
USPC .................................. 717/124–129
See application file for complete search history.

(56) References Cited

U.S. PATENT DOCUMENTS

| | | | |
|---|---|---|---|
| 5,896,523 A | 4/1999 | Bissett et al. | |
| 6,904,596 B1 | 6/2005 | Clark et al. | |
| 7,228,348 B1 * | 6/2007 | Farley et al. | H04L 43/16 709/224 |
| 7,613,848 B2 | 11/2009 | Amini et al. | |
| 7,644,110 B2 | 1/2010 | Nishizawa et al. | |
| 8,095,690 B2 | 1/2012 | Kashiyama et al. | |
| 8,131,840 B1 * | 3/2012 | Denker | H04L 67/2819 370/252 |
| 8,327,337 B2 * | 12/2012 | Barsness et al. | 717/129 |
| 2004/0170127 A1 | 9/2004 | Tanaka | |
| 2007/0113218 A1 * | 5/2007 | Nolan et al. | G06F 11/362 717/124 |
| 2009/0313614 A1 * | 12/2009 | Andrade et al. | 717/151 |
| 2010/0191941 A1 | 7/2010 | Yamagata et al. | |

(Continued)

OTHER PUBLICATIONS

Ballard et al., "IBM InfoSphere Streams: Harnessing Data in Motion", IBM Redbooks, Sep. 2010, 360 pages, First Edition, © Copyright International Business Machines Corporation 2010. http://www.redbooks.ibm.com/abstracts/sg247865.html.

(Continued)

*Primary Examiner* — Chat Do
*Assistant Examiner* — Jae Jeon
(74) *Attorney, Agent, or Firm* — Richard A. Wilhelm; Feb R. Cabrasawan

(57) ABSTRACT

A first stream operator in a stream computing application receives and processes a first stream of tuples. The processing at the first stream operator is paused in response to receiving a first one of the tuples in the first stream that triggers a breakpoint in the first stream operator. A determination of whether a condition to release the breakpoint is met is made, and the breakpoint is released in response to determining that the condition is met. The condition to release the breakpoint may be that a count of tuples of the first stream is outside of a threshold. A second stream of tuples may be received for processing at a second stream operator. The condition to release the breakpoint may be that a count of tuples of the second stream is outside of a threshold.

2 Claims, 7 Drawing Sheets

(56) References Cited

U.S. PATENT DOCUMENTS

| | | |
|---|---|---|
| 2011/0013538 A1 | 1/2011 | Henocq et al. |
| 2012/0137178 A1* | 5/2012 | Barsness et al. ...... G06F 11/362 714/35 |
| 2012/0185730 A1* | 7/2012 | Moran et al. ........ G06F 11/3648 714/37 |
| 2012/0215934 A1 | 8/2012 | Barsness et al. |
| 2012/0218268 A1 | 8/2012 | Accola et al. |
| 2013/0305225 A1* | 11/2013 | Branson et al. ............... 717/128 |
| 2014/0089603 A1 | 3/2014 | Krishnapura et al. |
| 2014/0196017 A1* | 7/2014 | Halim et al. .................. 717/149 |

OTHER PUBLICATIONS

Law, Yan Nei., "Models and Operators for Continuous Queries on Data Streams", Dissertation for Doctor of Philosophy in Computer Science, University of California, Las Angeles, 2006.

Santosuosso et al., "Management System for Processing Streaming Data", Filed Jul. 26, 2011. U.S. Appl. No. 13/190,810.

* cited by examiner

BREAKPOINT CONTINUATION FOR STREAM COMPUTING

FIELD

This disclosure generally relates to stream computing, and in particular, to the development of computing applications that receive streaming data and process the data as it is received, including techniques for facilitating the debugging of a stream computing application.

BACKGROUND

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

Computer applications, such as database systems, include many computer programs. The development of a computer program includes creating source code, which may include many thousands of lines of instructions. The source code is converted into an executable program or machine code using a compiler. Computer programs, especially new ones, typically contain errors, commonly referred to as "bugs." Debugging involves testing and evaluating the computer program to find and correct errors. A programmer may use a computer program, commonly referred to as a "debugger" to assist in debugging a program. A debugger allows the programmer to execute a computer program under the control of the debugger, allowing a process to be monitored.

SUMMARY

Embodiments of the disclosure provide a method, system, and computer program product for processing data. The method, system, and computer program product receive two or more tuples to be processed by a plurality of processing elements operating on one or more computer processors. In various embodiments, a method for debugging a stream computing application includes a first stream operator receiving a first stream of tuples. The first stream of tuples is processed at the first stream operator. The processing at the first stream operator is paused in response to receiving a first one of the tuples in the first stream that triggers a breakpoint in the first stream operator. A determination of whether a condition to release the breakpoint is met is made, and the breakpoint is released in response to determining that the condition is met. The condition to release the breakpoint may be that a count of tuples of the first stream is outside of a threshold. A second stream of tuples may be received for processing at a second stream operator. The condition to release the breakpoint may be that a count of tuples of the second stream is outside of a threshold.

Other embodiments are directed to a computer program product and a system.

BRIEF DESCRIPTION OF THE DRAWINGS

Like reference numbers and designations in the various drawings indicate like elements.

DETAILED DESCRIPTION

Figure 1:
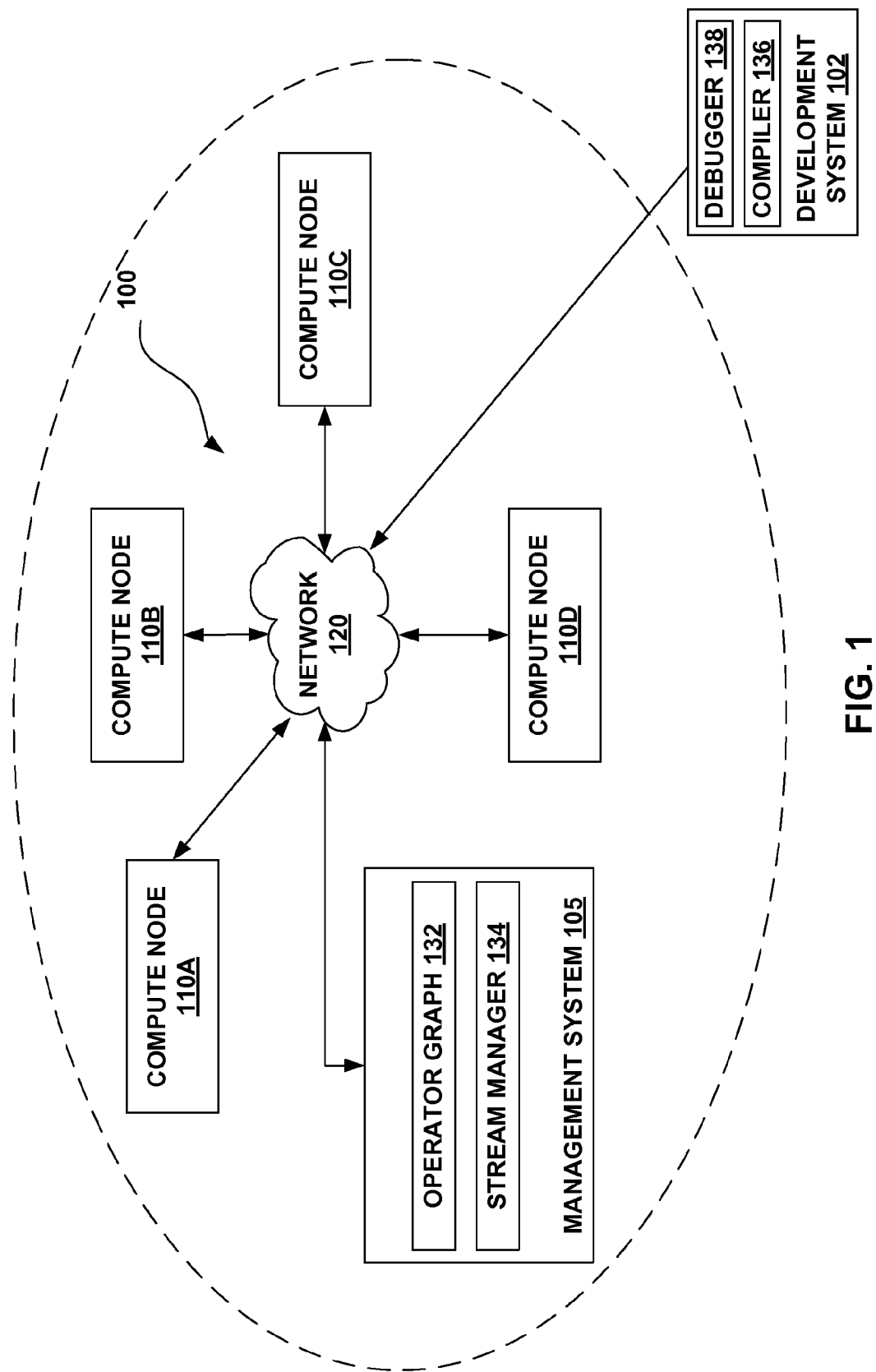
FIG. 1 illustrates a computing infrastructure configured to execute a stream computing application according to various embodiments.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second.

Like traditional database systems, developers of stream computing applications need to identify the causes of bugs, poor performance, and similar issues. However, traditional debugging approaches may be inadequate to meet the needs of developers of stream computing applications. This may be due in part to the fact that the processing elements in a stream environment are distributed across multiple nodes and computer systems, with each processing element running in a separate process. In addition, even though the processing elements are running in many separate processes, there are typically significant interdependencies between processing elements. Because of the interdependencies, the cause of a bug may at a different node from the node where erroneous results appear.

A conventional debugger allows the programmer to execute a computer program under the control of the debugger. A running computer program, i.e., a process, may be monitored with a debugger. The debugger may be used to determine the order in which instructions are executed. The debugger may be used to inspect the values of variables at various points in program execution. Among other features, debuggers typically support a breakpoint operation. Conventionally, a "breakpoint" function permits a programmer to set a breakpoint at a particular instruction or line. Program instructions are executed until the instruction with the breakpoint is reached. Execution of the program is paused at the instruction immediately preceding the breakpoint instruction and the values of variables at the breakpoint instruction may be presented to the programmer for analysis. The debugger may be used to change the value of a variable of a paused process.

A conventional debugger may be used to debug the source code of an individual stream operator running as a standalone application outside of the streams environment. However, a bug may not appear when the stream operator running logic is running as a standalone application. The bug may only appear when all of the processing elements are running in a streaming environment. Further, it may be difficult to determine which stream operator includes the logic that is causing the bug. Accordingly, there is a need to debug stream operators while the stream computing application is running.

One of the challenges of debugging a stream computing application is to allow the application to be debugged without interfering with the data flow. If a debugger is used to set a breakpoint in a stream operator, triggering the breakpoint can substantially slowdown, disrupt, or halt data flowing through portions of an operator graph. In addition, stream operators downstream of the stream operator with the triggered breakpoint may be starved of input data. In other words, while a process in a particular stream operator is being debugged, the stream computing application may be prevented from running.

In various embodiments, a streams application is executing under the control of a debugger. During execution, a first stream of tuples are received and processed at a first stream operator. A breakpoint may be set in the first stream operator. The processing may be paused at the first stream operator in response to receiving a first one of the tuples in the first stream that triggers the breakpoint. While processing is paused at the first stream operator, data may be flowing in other parts of the operator graph and other stream operators may process data. In addition, while processing is paused at the first stream operator, a determination may be made as to whether a condition to release the breakpoint is met. Moreover, the breakpoint may be automatically released in response to determining that the breakpoint is met.

Automatically releasing a breakpoint may minimize the amount of time the stream computing application may be prevented from running. Automatically releasing the breakpoint may permit the stream computing application to resume running when data is backing up in various parts of the operator graph or when various parts of the operator graph are starved of data. Automatically releasing the breakpoint may permit the stream computing application to resume running when the data flow in another part of the operator graph is of greater interest to the programmer than the part of the graph where the breakpoint was triggered.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A development system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet.

Figure 2:
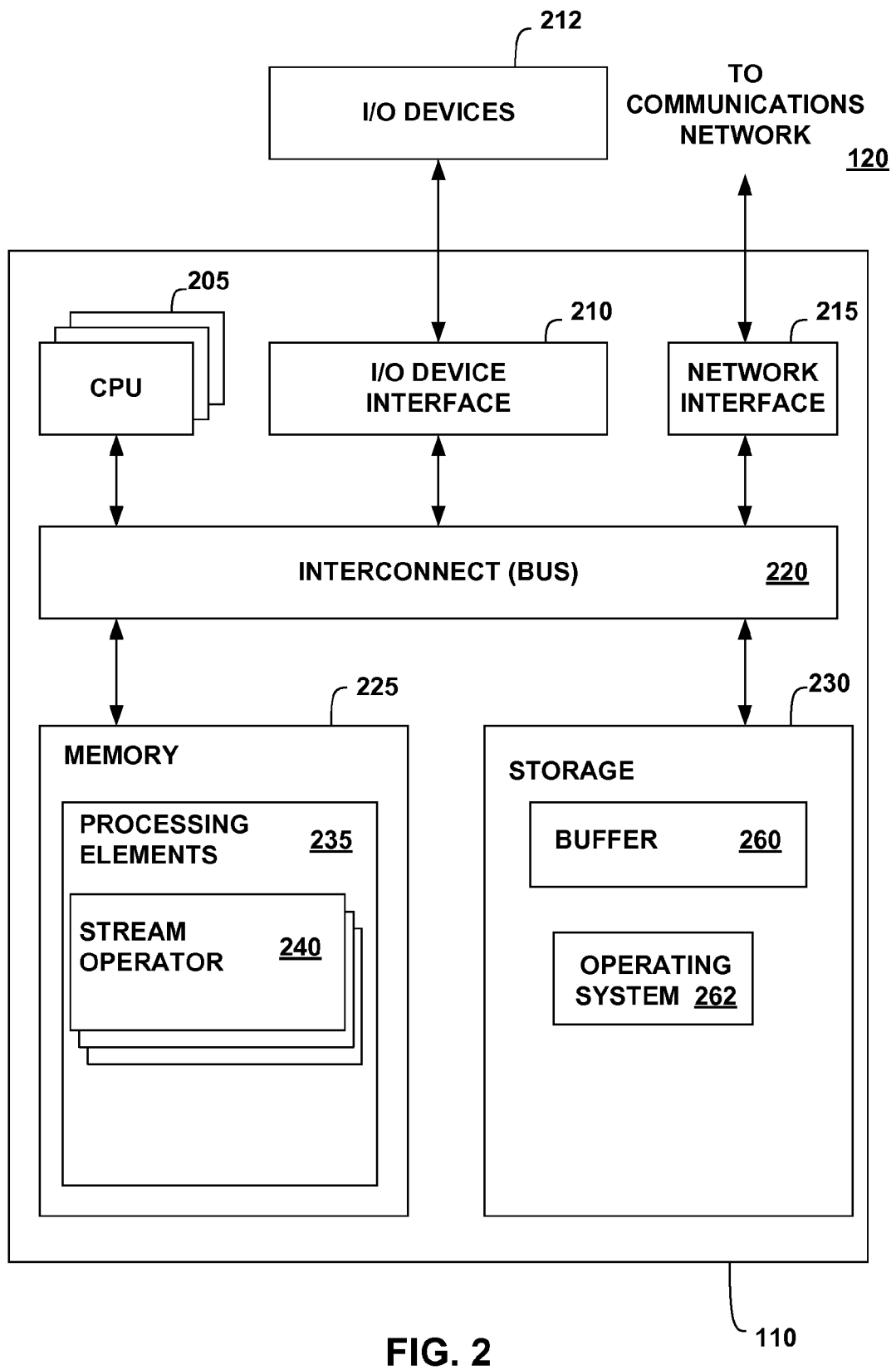
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260 for storing buffered stream data 260. The buffer 260 represents a storage space for data flowing into the compute node 110 from upstream processing elements (or from a data source for the stream application). For example, buffered stream data may include data tuples waiting to be processed by one of the PEs 235. Buffered stream data may also store the results of data processing performed by PEs 235 that will be sent to downstream processing elements (or load shed). Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
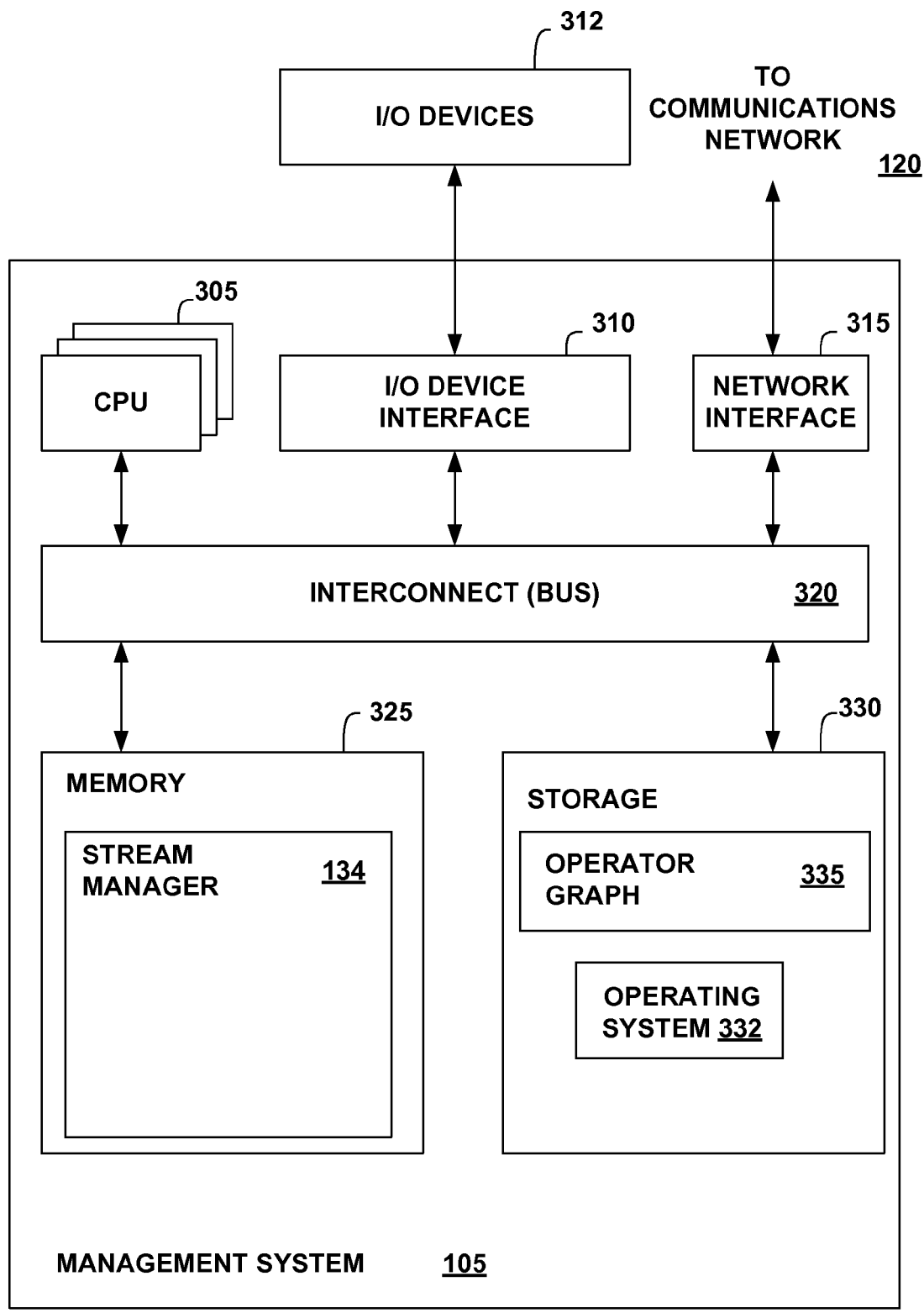
FIG. 3 illustrates a more detailed view of the management system of FIG. 1 according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
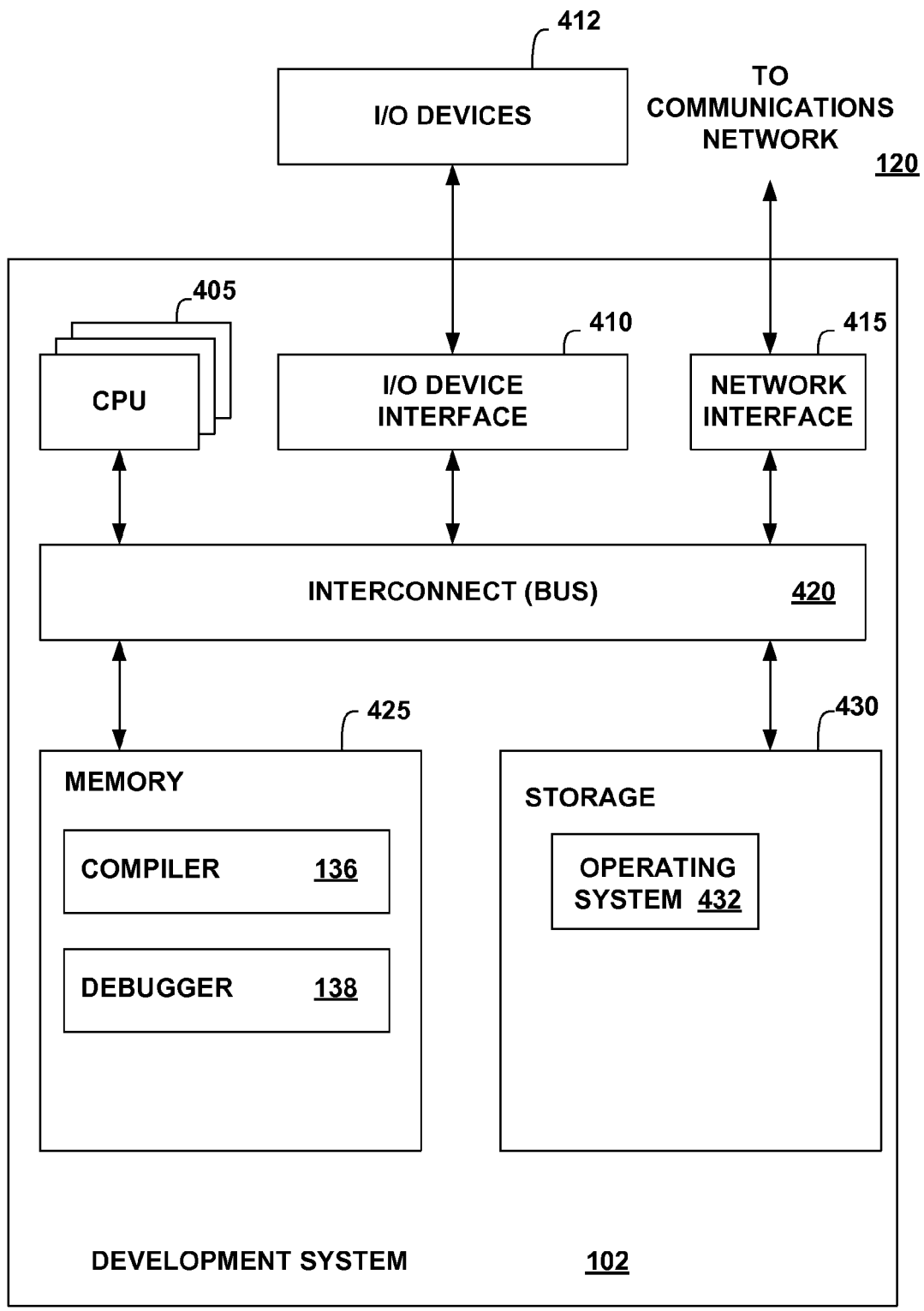
FIG. 4 illustrates a more detailed view of the compiler system of FIG. 1 according to various embodiments.

FIG. 4 is a more detailed view of the development system 102 of FIG. 1 according to some embodiments. The development system 102 may include, without limitation, one or more processors (CPUs) 405, a network interface 415, an interconnect 420, a memory 425, and storage 430. The development system 102 may also include an I/O device interface 410 connecting I/O devices 412, e.g., keyboard, display, and mouse devices, to the development system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The development system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. In various embodiments, the compiler 136 may generate object code in a form that facilitates debugging. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

The memory 425 may also store a stream debugger 138. The stream debugger 138 may be used to manage the debugging of a processing element (PE) or stream operator on one (or more) of the compute nodes 110. For example, the stream debugger 138 may be used to set breakpoints, to execute instructions to step into (or over) function calls in the instructions, to inspect variables, etc., as well as provide a variety of other functions and features used for debugging the processing elements 235 or stream operators 240. For example, the stream debugger 138 may determine whether a condition to release a breakpoint has been met. The stream debugger 138 may automatically release the breakpoint in response to determining that a condition has been met. In various embodiments, there may be a variety of conditions to release the breakpoint.

The condition to release the breakpoint may be that a count of tuples at the stream operator where the breakpoint is triggered is outside of a threshold. In an embodiment, a breakpoint may be set and triggered in a first stream operator that receives as input a first stream of tuples. The condition to release the breakpoint may be that a count of tuples in the first stream is outside of a threshold.

The condition to release the breakpoint may be that a count of tuples at a stream operator different from the one where the breakpoint is triggered is outside of a threshold. In an embodiment, the breakpoint may be set and triggered in a first stream operator that receives as input a first stream of tuples. The condition to release the breakpoint may be that a count of tuples in a second stream that is input to a second stream operator is outside of a threshold.

The condition to release the breakpoint may be that a count associated with a group of stream operators in an operator graph is outside of a threshold. In an embodiment, the breakpoint may be set and triggered in a first stream operator that receives as input a first stream of tuples. A second stream of tuples may be received to be processed at a second stream operator. A third stream of tuples may be received to be processed at a third stream operator. The condition to release the breakpoint may be that a first count of tuples of the second stream is outside of a first threshold or a second count of tuples of the third stream is outside of a second threshold, or that both the first and second counts are outside of their respective thresholds.

The condition to release the breakpoint may be based on a rate of tuples received at the stream operator where the breakpoint is triggered. The condition to release the breakpoint may be that the rate is outside of a threshold. The rate may be expressed as a range, e.g., if tuples are flowing into a stream operator in a range greater than 1,000 tuples per minute, the breakpoint will be released. In an embodiment, the breakpoint may be set and triggered in a first stream operator that receives as input a first stream of tuples. The condition to release the breakpoint may be that a quantity of tuples of the first stream per unit of time is outside of a threshold.

The condition to release the breakpoint may be based on a rate of tuples received at a stream operator different from the one where the breakpoint is triggered. The condition to release the breakpoint may be that the rate is outside of a threshold. In an embodiment, the breakpoint may be set and triggered in a first stream operator that receives as input a first stream of tuples. The condition to release the breakpoint is that a quantity of tuples per unit of time of a second stream input to a second stream operator is outside of a threshold.

The condition to release the breakpoint may be based on analyzing one or more attributes of tuples in an input stream of tuples. For example, a first attribute may be an integer value. The first attribute of each received tuple may be analyzed to determine if the attribute data is greater than a particular value. If the first attribute is greater than the value, a count is incremented. The condition to release the breakpoint is met when a count of tuples having a first attribute greater than the particular value exceeds a count threshold. In an embodiment, the breakpoint may be set and triggered in a first stream operator that receives as input a first stream of tuples. The condition to release the breakpoint may include determining whether a first attribute of a tuple of the first stream meets an attribute condition, e.g., the first attribute is outside of an attribute threshold. The condition to release the breakpoint may be that a count of tuples of the first stream that meet the attribute condition is outside of a count threshold.

The condition to release the breakpoint may be based on a change in the rate of tuples received at the stream operator where the breakpoint is triggered or at another stream operator. For example, tuples of a first stream are received at first rate. Subsequently, tuples of a first stream are received at second rate. The difference between the first and second rates is determined. If the difference is outside of a threshold, the breakpoint is released. In an embodiment, the condition to release the breakpoint is based on a first quantity of tuples of the first stream per unit of time changing to a second quantity of tuples of the first stream per unit of time. The condition to release the breakpoint is that a difference between the first quantity of tuples of the first stream per unit of time and the second quantity of tuples of the first stream per unit of time is outside of a rate difference threshold.

Figure 5:
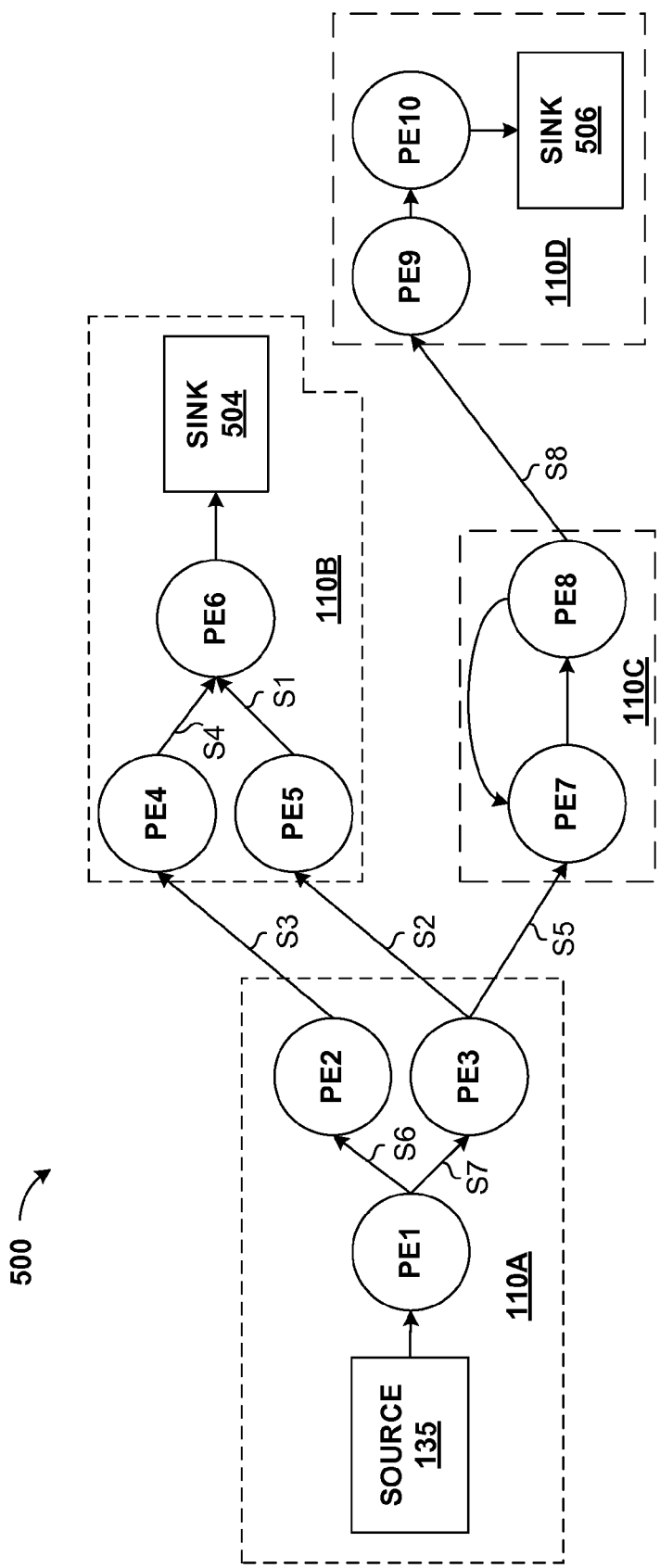
FIG. 5 illustrates an operator graph for a stream computing application according to various embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Some representative data flows or streams between processing elements are labeled in FIG. 5. Stream S1 represents a stream flowing from PE5 to PE6. Stream S2 represents a stream flowing from PE3 to PE5. Stream S3 represents a stream flowing from PE2 to PE4. Stream S4 represents a stream flowing from PE4 to PE6. Stream S5 represents a stream flowing from PE3 to PE7. Stream S6 represents a stream flowing from PE1 to PE2. Stream S7 represents a stream flowing from PE1 to PE3. Stream S8 represents a stream flowing from PE8 to PE9. The streams depicted in FIG. 5 do not include streams that may flow between stream operators within a processing element, nor are they intended to be an exhaustive representation of all streams in the operator graph 500.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity. The execution paths are coextensive with the shown streams.

Figure 6:
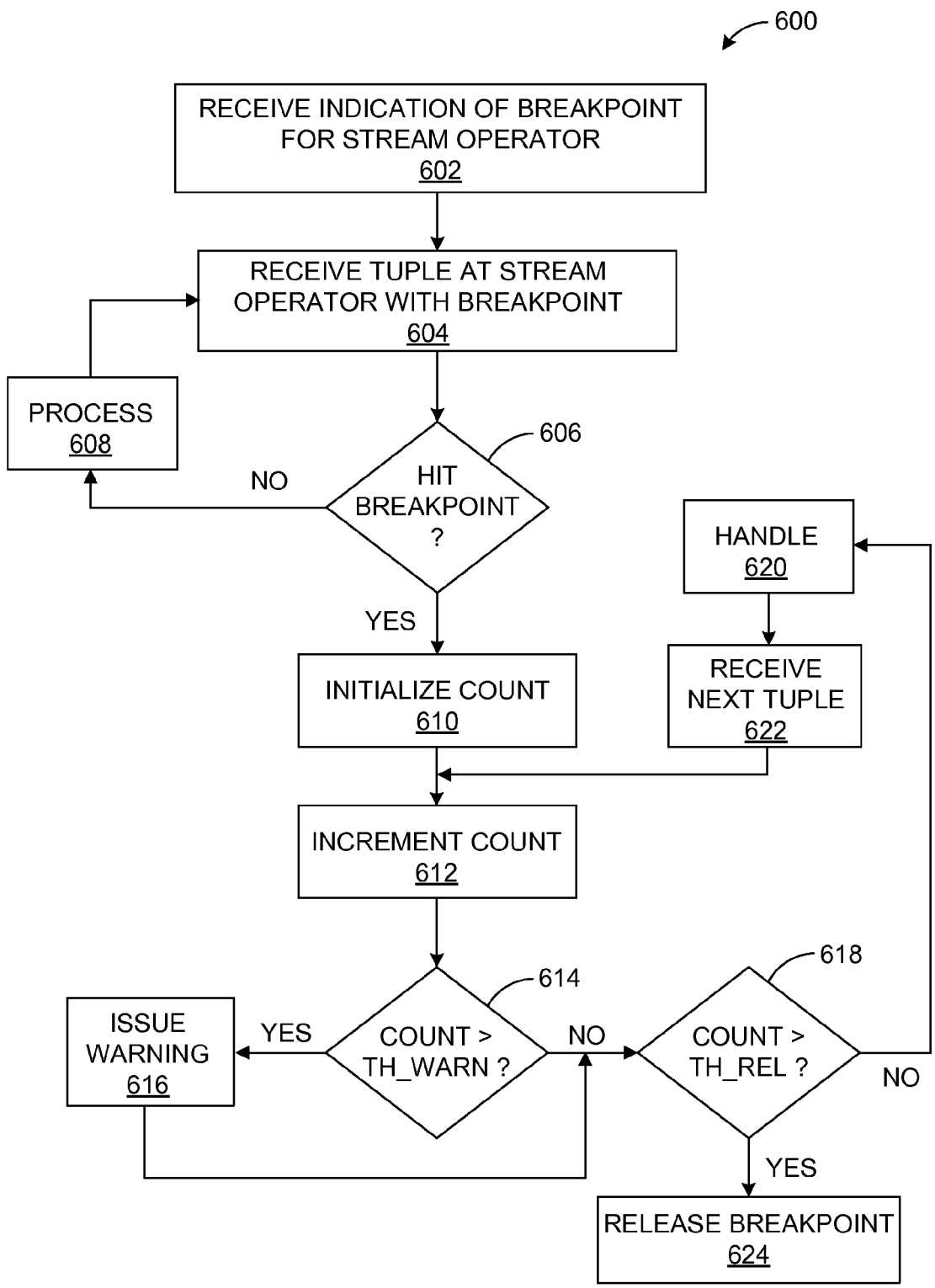
FIG. 6 illustrates a process for debugging a stream computing application according to various embodiments.

FIG. 6 illustrates a process 600 for debugging a stream computing application according to various embodiments. A stream debugger receives an indication of a breakpoint for a stream operator at operation 602. The breakpoint is set at the indicated stream operator. The stream computing application is then run under the control of the stream debugger. At operation 604, a tuple is received at the stream operator where the breakpoint is set. It is determined in operation 606 whether the received tuple causes the breakpoint to be triggered. A breakpoint may be triggered because the received tuple causes a particular line of code to be executed. In addition, a breakpoint may be triggered because a condition is met. For example, an attribute of the received tuple may meet a condition, e.g., the attribute is of a particular size or type. If the received tuple does not cause the breakpoint to be triggered, the tuple may be processed in operation 608. After processing the tuple, the process 600 returns to operation 604, where a next tuple is received. If the received tuple causes the breakpoint to be triggered, the process 600 moves to operation 610.

In operation 610, a count may be initialized, e.g., set to zero. In operation 612, the count is incremented in response to receiving (or transmitting) a tuple at one or more locations in an operator graph, as further described below. (In an alternative, the count may be initialized to an integer and decremented in operation 612.) The count is compared with a threshold associated with a warning in operation 614. If the count is less than the warning threshold, the count is compared with a threshold associated with releasing the breakpoint in operation 618. If the count is less than the breakpoint release threshold, the tuple is "handled" in operation 620, as described below. After handling, a next tuple is received in operation 622 and the process 600 returns to operation 612, where the count is incremented for the next received tuple.

If the count is determined to be outside (e.g., greater than or equal to) the warning threshold in operation 614, a warning indication may be provided to a programmer in operation 616. The warning indication may indicate how much longer the breakpoint will be held before release.

If the count is outside (e.g., greater than or equal to) the breakpoint release threshold, the breakpoint is automatically released in operation 624. Automatically releasing the breakpoint may minimize the amount of time the stream computing application may be prevented from running. Automatically releasing the breakpoint may permit the stream computing application to resume running when data is backing up in various parts of the operator graph or when various parts of the operator graph are starved of data. Automatically releasing the breakpoint may permit the stream computing application to resume running when the data flow in another part of the operator graph is of greater interest to the programmer than the part of the graph where the breakpoint was triggered.

As mentioned, the count is incremented in operation 612. In an embodiment, the count may be a count of tuples received at the stream operator where the breakpoint is triggered. For example, if the stream operator where the breakpoint is triggered is in PE6, the count may be a count of tuples in one or both of the streams S1 or S4 (FIG. 5). In another embodiment, the count may be a count of tuples at a stream operator different from the one where the breakpoint is triggered. For example, if the stream operator where the breakpoint is triggered is in PE6, the count may be a count of tuples in the stream S2, stream S3, stream S5, stream S6, stream S7, or stream S8 (FIG. 5). In yet another embodiment, the count may be a count of tuples associated with a group of stream operators. For example, the stream operators in PE2 and PE3 may be a group of streams operators. The count may be counts of tuples in the stream S2, stream S3, and stream S5. In this embodiment, the count for each stream may be compared with warning and breakpoint release thresholds (in operations 614 and 618) that may be unique for each stream.

A tuple may be handled in operation 620 in a variety of ways according to various embodiments. In an embodiment, a currently received tuple may be processed by a stream operator in operation 620. For example, if the count is of tuples at a stream operator different from the one where the breakpoint is triggered, that other stream operator may process the received tuple. In an embodiment, a currently received tuple may be stored in operation 620. For example, if the count is a count of tuples received at the stream operator where the breakpoint is triggered, received tuples may be stored in the buffer 260. In an embodiment, a currently received tuple may be shed, i.e., discarded, in operation 620. In an embodiment, a currently received tuple may be routed to another stream operator for processing in operation 620.

Figure 7:
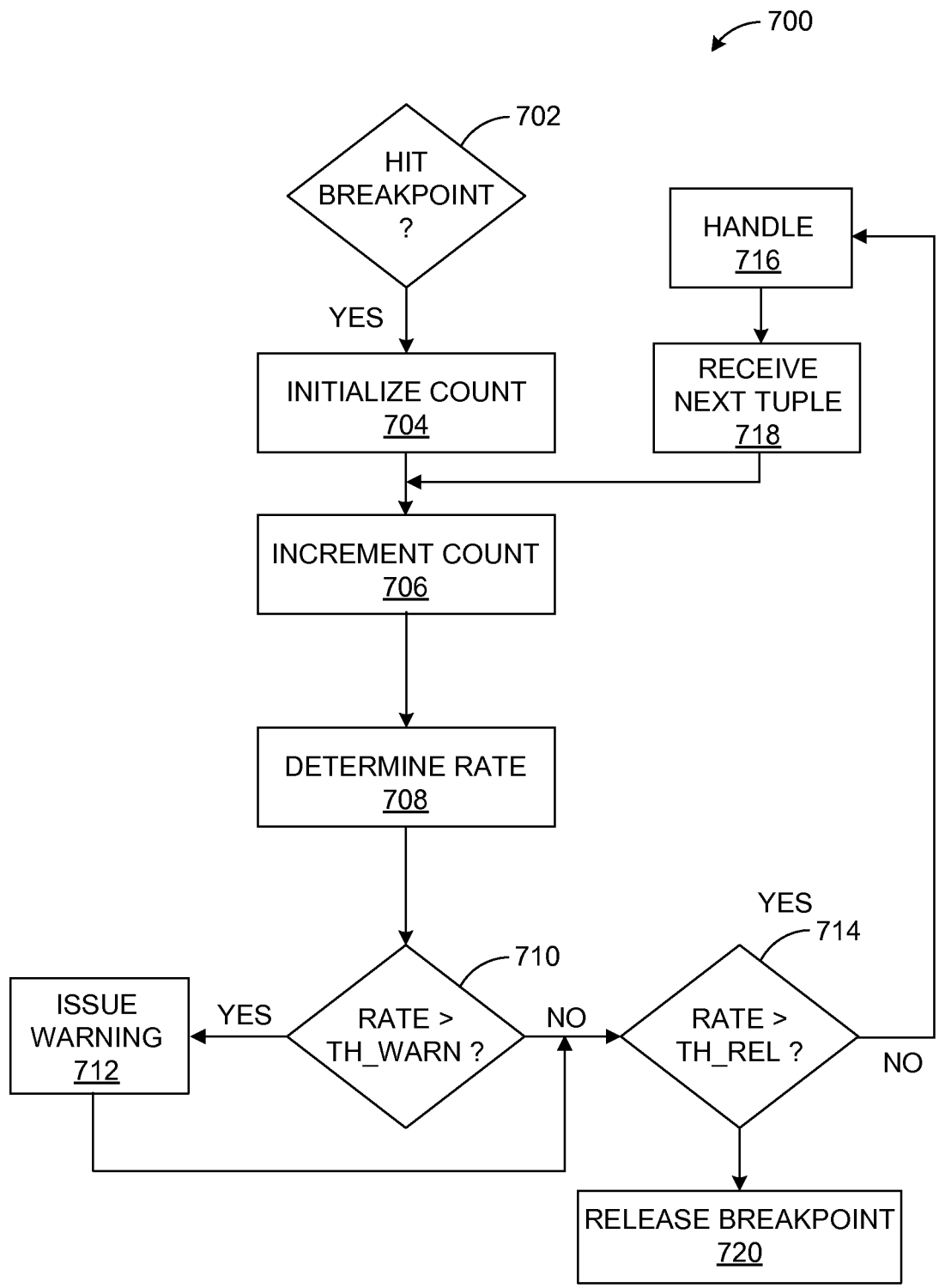
FIG. 7 illustrates a process for debugging a stream computing application according to various embodiments.

FIG. 7 illustrates a process 700 for debugging a stream computing application according to various embodiments. The process 700 is premised on a breakpoint first being set in a stream operator in the stream computing application, for example, as describe in process 600. In operation 704, it is determined whether a received tuple causes the breakpoint to be triggered. If the breakpoint is triggered, a count may be initialized in operation 704 in the same manner as in operation 610. In operation 705, the count is incremented in response to receiving (or transmitting) a tuple at one or more locations in an operator graph in the same manner as in operation 612. In operation 708, the count is use to determine a rate, i.e., a quantity of tuples of the second stream per unit of time. For example, operation 708 may determine a rate in terms of tuples per minute.

The rate is compared with a rate threshold associated with a warning in operation 710. If the rate is determined to be outside of (e.g., greater than or equal to) the rate warning threshold in operation 710, a warning indication may be provided to a programmer in operation 712. If the rate is not determined to be outside the warning threshold in operation 710, it is determined, in operation 714, whether the rate is outside of a threshold associated with releasing the breakpoint. If the rate is outside of the breakpoint rate release threshold, the tuple may be "handled" in operation 716. The operation 716 may be the same as the operation 620. After handling, a next tuple is received in operation 718 and the process 700 returns to operation 706, where the count is incremented for the next received tuple. The operation 718 may be the same as the operation 622.

In an embodiment, the process 700 may include one or more operations (not shown) in which a rate determined in operation 708 is saved and compared with a rate determined in operation 708 at a later time. For example, a first rate may be determined at a first time and a second rate may be determined at a second time, the second time being subsequent to the first time. A difference between the first and second rates may be determined and compared with a difference threshold. If the difference is outside of the difference threshold, the breakpoint is relased.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language; (b) conventional procedural programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Additional embodiments may be configured to operate with any computer system or application capable of performing the functions described herein. For example, embodiments may be configured to operate in a clustered environment with a standard database processing application. A multi-nodal environment may operate in a manner that effectively processes a stream of tuples. For example, some embodiments may include a large database system, and a query of the database system may return results in a manner similar to a stream of data.

While the foregoing is directed to exemplary embodiments, other and further embodiments of the disclosure may be devised without departing from the basic scope thereof, and the scope thereof is determined by the claims that follow.

What is claimed is:

1. A method for debugging a stream computing application having a plurality of processing elements operating on one or more computer processors, each processing element having one or more stream operators, comprising:
   receiving a first stream of tuples at a first stream operator;
   processing the first stream of tuples at the first stream operator;
   pausing the processing at the first stream operator in response to receiving a first one of the tuples in the first stream that triggers a breakpoint in the first stream operator;
   determining whether a first attribute of one or more tuples of the first stream received subsequent to pausing the processing meet an attribute condition;
   determining whether first and second conditions to release the breakpoint are met,
      wherein the first condition to release the breakpoint is that a count of tuples of the first stream received subsequent to the pausing of the processing that meet the attribute condition is outside of a first threshold, and
      wherein the second condition to release the breakpoint is that a first quantity of tuples of the first stream per unit of time received subsequent to the pausing of the processing changes to a second quantity of tuples of the first stream per unit of time received subsequent to the pausing of the processing, and a difference between the first quantity of tuples of the first stream per unit of time and the second quantity of tuples of the first stream per unit of time is outside of a second threshold; and
   releasing the breakpoint in response to determining that the first and second conditions are met.

2. A computer program product for processing a stream of tuples, the computer program product comprising a non-transitory computer readable storage medium having program code embodied therewith, the program code comprising computer readable program code configured to facilitate debugging of a stream computing application having a plurality of processing elements operating on one or more computer processors, each processing element having one or more stream operators, comprising:
   receiving a first stream of tuples at a first stream operator;
   processing the first stream of tuples at the first stream operator;
   pausing the processing at the first stream operator in response to receiving a first one of the tuples in the first stream that triggers a breakpoint in the first stream operator;
   determining whether a first attribute of one or more tuples of the first stream received subsequent to pausing the processing meet an attribute condition;
   determining whether first and second conditions to release the breakpoint are met,
      wherein the first condition to release the breakpoint is that a count of tuples of the first stream received subsequent to the pausing of the processing that meet the attribute condition is outside of a first threshold, and
      wherein the second condition to release the breakpoint is that a first quantity of tuples of the first stream per unit of time received subsequent to the pausing of the processing changes to a second quantity of tuples of the first stream per unit of time received subsequent to the pausing of the processing, and a difference between the first quantity of tuples of the first stream per unit of time and the second quantity of tuples of the first stream per unit of time is outside of a second threshold; and
   releasing the breakpoint in response to determining that the first and second conditions are met.

* * * * *